United States Patent
Apokatanidis et al.

(10) Patent No.: US 10,825,031 B2
(45) Date of Patent: **\*Nov. 3, 2020**

(54) SYSTEM FOR OBSERVING AND ANALYZING CUSTOMER OPINION

(71) Applicant: International Business Machines Corporation, Armonk, NY (US)

(72) Inventors: Dimitri Apokatanidis, Saint-Lambert (CA); Jeffrey P. Brown, Strathroy (CA); Emmanuel B. Gonzalez, Guadalajara (MX); Shaun E. Harrington, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,893

(22) Filed: Jul. 2, 2019

(65) Prior Publication Data

US 2019/0325462 A1 Oct. 24, 2019

Related U.S. Application Data

(63) Continuation of application No. 14/683,814, filed on Apr. 10, 2015, now Pat. No. 10,438,215.

(51) Int. Cl.
*G06Q 30/00* (2012.01)
*G06Q 30/02* (2012.01)
(Continued)

(52) U.S. Cl.
CPC ......... *G06Q 30/0201* (2013.01); *G06Q 30/01* (2013.01); *G06Q 30/0609* (2013.01); *H04N 7/181* (2013.01)

(58) Field of Classification Search
None
See application file for complete search history.

(56) References Cited

U.S. PATENT DOCUMENTS

| 5,798,798 A | 8/1998 | Rector et al. |
| 6,679,830 B2 | 1/2004 | Kolarovic et al. |

(Continued)

FOREIGN PATENT DOCUMENTS

| CN | 102122346 | 7/2011 |
| WO | 2006/040974 A1 | 4/2006 |

OTHER PUBLICATIONS

Johannes Krockel et al., "Visual Customer Behavior Analysis Based on Customer Movements", 7th International Conference on Information Technology and Applications, 2011, Journal of Information Technology and applications, ISSN 1839-0048 Edition: 24.

(Continued)

*Primary Examiner* — Mohammad J Rahman
(74) *Attorney, Agent, or Firm* — Kunzler Bean & Adamson

(57) ABSTRACT

A system for observing and analyzing customer opinions is disclosed. The system includes one or more cameras, a focus tracking module, an observation module, an interpretation module, and a rating module. The focus tracking module uses the one or more cameras to determine a product having a focus of a person, the product having a plurality of characteristics. The observation module uses the one or more cameras to monitor one or more physical, physiological, or behavioral characteristics of the person with respect to the product. The interpretation module determines an opinion of the person regarding the product. The rating module adjusts one or more ratings of the product in response to the interpretation module determining the opinion of the person regarding the product.

20 Claims, 5 Drawing Sheets

(51) Int. Cl.
*G06Q 30/06* (2012.01)
*H04N 7/18* (2006.01)

(56) References Cited

U.S. PATENT DOCUMENTS

| | | | |
|---|---|---|---|
| 7,319,780 B2 | 1/2008 | Fedorovskaya et al. | |
| 7,925,549 B2 | 4/2011 | Looney et al. | |
| 8,009,863 B1 | 8/2011 | Sharma et al. | |
| 8,219,438 B1* | 7/2012 | Moon | G06Q 30/0201 |
| | | | 705/7.29 |
| 8,577,705 B1 | 11/2013 | Baboo et al. | |
| 8,634,591 B2 | 1/2014 | Jeanne et al. | |
| 9,798,383 B2 | 10/2017 | Horesh | |
| 9,811,989 B2 | 11/2017 | Austin | |
| 2002/0161664 A1* | 10/2002 | Shaya | G06Q 30/0254 |
| | | | 705/7.31 |
| 2002/0190866 A1 | 12/2002 | Richardson | |
| 2004/0101212 A1 | 5/2004 | Fedorovskaya et al. | |
| 2005/0003839 A1 | 1/2005 | Tripp | |
| 2008/0065468 A1* | 3/2008 | Berg | G06Q 30/02 |
| | | | 705/7.32 |
| 2008/0243614 A1 | 10/2008 | Tu et al. | |
| 2010/0061596 A1 | 3/2010 | Mostafavi et al. | |
| 2010/0305411 A1 | 12/2010 | Paul | |
| 2012/0075530 A1 | 3/2012 | Miyazaki et al. | |
| 2012/0158551 A1 | 6/2012 | Gonsalves et al. | |
| 2013/0110666 A1 | 5/2013 | Aubrey | |
| 2013/0190556 A1 | 7/2013 | Wetmore et al. | |
| 2014/0057232 A1 | 2/2014 | Wetmore et al. | |
| 2014/0078301 A1 | 3/2014 | Fazzi et al. | |
| 2014/0207264 A1 | 7/2014 | Quy | |
| 2014/0236953 A1 | 8/2014 | Rapaport et al. | |
| 2014/0258049 A1 | 9/2014 | Gonsalves et al. | |
| 2014/0278745 A1 | 9/2014 | Herring et al. | |
| 2014/0372211 A1 | 12/2014 | Kritt et al. | |
| 2016/0239624 A1* | 8/2016 | Short | G09B 5/12 |
| 2016/0255305 A1* | 9/2016 | Ritchey | G02B 27/0172 |
| | | | 348/14.03 |
| 2017/0024986 A1 | 1/2017 | Austin | |

OTHER PUBLICATIONS

List of IBM Patent or Patent Applications Treated as Related Filed on Apr. 10, 2015.

* cited by examiner

SYSTEM FOR OBSERVING AND ANALYZING CUSTOMER OPINION

REFERENCE TO RELATED APPLICATION

The present application is a continuation of and claims priority to U.S. patent application Ser. No. 14/683,814 filed on Apr. 10, 2015, the contents of which are incorporated herein by reference in their entirety.

FIELD

The subject matter disclosed herein relates to observing and analyzing customer opinion and more particularly relates to real-time observation and analysis of retail customer opinions to products.

BACKGROUND

Retail stores routinely decide what to sell and stock product inventory based on a combination of past sales and future projections based on customer product surveys. Customer surveys of new products are often conducted in a controlled environment that differ from an actual retail shopping experience. Products that are popular with consumers in a controlled environment may not sell well in an actual store, or vice versa. A variety of factors besides the actual physical characteristics of a product may influence whether a retail customer will purchase it. Among other things, the price, marketing, and location of a product within a store may all influence a retail consumer's purchasing decision.

SUMMARY

A system for observing and analyzing customer opinions is disclosed. The system includes one or more cameras, a focus tracking module, an observation module, an interpretation module, and a rating module. The focus tracking module uses the one or more cameras to determine a product having a focus of a person, the product having a plurality of characteristics. The observation module uses the one or more cameras to monitor one or more physical, physiological, or behavioral characteristics of the person with respect to the product. The interpretation module determines an opinion of the person regarding the product. The rating module adjusts one or more ratings of the product in response to the interpretation module determining the opinion of the person regarding the product.

A method for observing and analyzing customer opinions is disclosed. The method includes using one or more cameras to determine a product having a focus of a person, using the one or more cameras to monitor one or more physical, physiological, or behavioral characteristics of the person with respect to the product, determining an opinion of the person regarding the product, and adjusting one or more ratings of the product in response to determining the opinion of the person regarding the product.

A computer program product for observing and analyzing customer opinion, the computer program product comprising a computer readable storage medium having program instructions embodied therewith, the program instructions readable/executable by a processor to cause the processor to use one or more cameras to determine a product having a focus of a person, use the one or more cameras to monitor one or more physical, physiological, or behavioral characteristics of the person with respect to the product, determine an opinion of the person regarding the product, and adjust one or more ratings of the product in response to determining the opinion of the person regarding the product.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
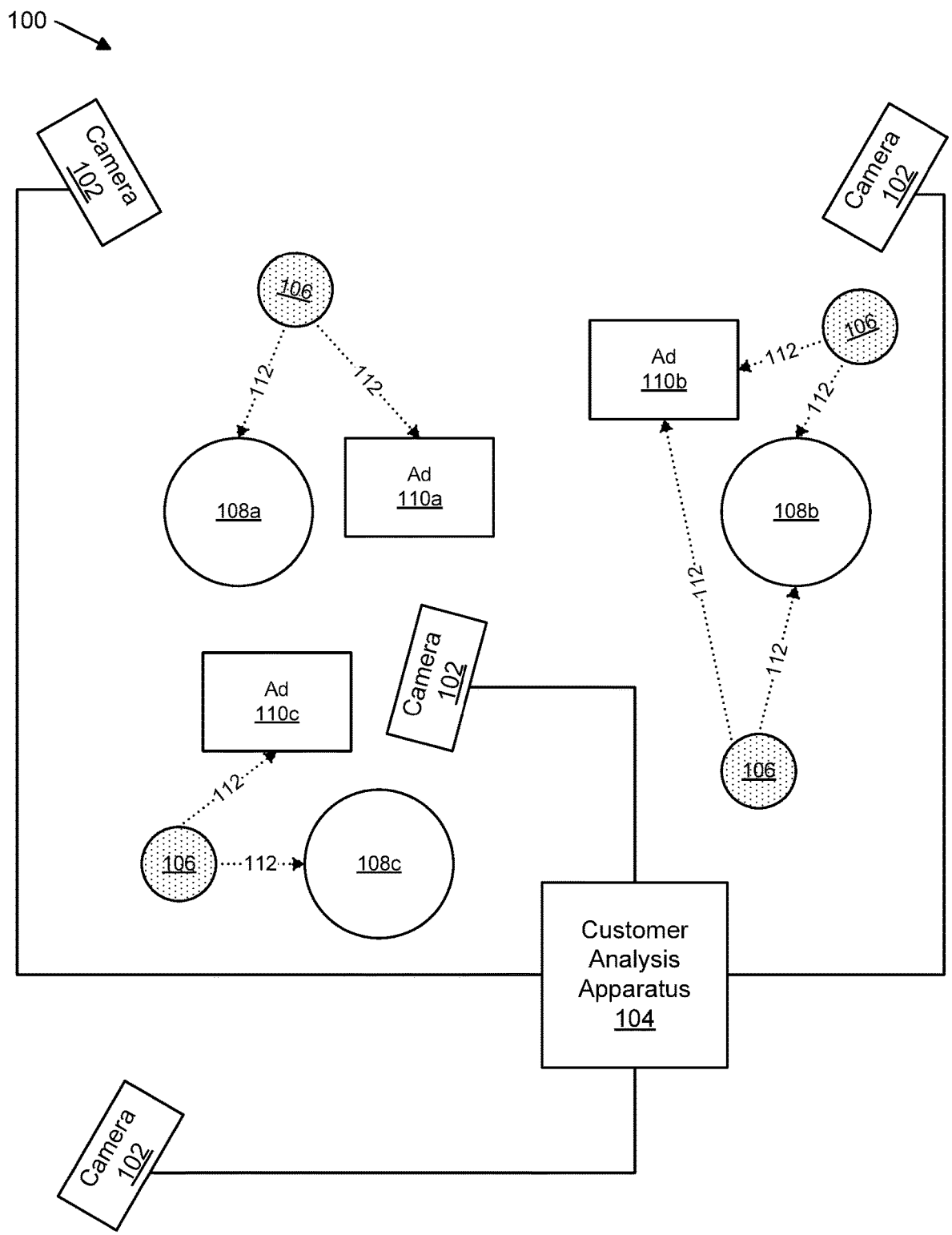
FIG. 1 is a schematic block diagram illustrating one embodiment of a system for observing and analyzing customer opinion in accordance with the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one embodiment of a system 100 for observing and analyzing customer opinion. The system 100 includes one or more cameras 102, a customer analysis apparatus 104, a plurality of persons 106 (106, as used herein may include one or more persons); a plurality of products 108a, 108b, 108c (collectively, "108"), a plurality of advertisements 110a, 110b, 110c (collectively, "110"), and a focus 112 of a person 106, which are described below.

The system 100 includes one or more cameras 102 connected to a customer analysis apparatus 104. The customer analysis apparatus 104 uses the one or more cameras 102 to observe a plurality of persons 106 in the vicinity of a plurality of products 108 and/or advertisements 110. The plurality of persons 106 may be individuals in a store, mall, car dealership, amusement park, convention center, museum, public space, or the like. The products 108 may include food, clothing, automobiles, furniture, appliances, and/or other goods. The products 108 can be arranged in any number of configurations, including but not limited to a linear, circular, polygonal, and/or random manner. For example, the products 108 may be food items sitting on a shelf in a supermarket aisle or clothing on a circular clothes rack in a department store. As another example, the products 108 may be automobiles parked in a showroom. At any given time, the plurality of persons 106 may view a product (e.g., 108a) from a number of different directions and angles, including from all directions or only certain directions. For example, a person 106 can view items on a shelf or clothing in a display window from the front, and to a certain degree, from off to the side. At the same time, an automobile on a showroom floor or a product display in a supermarket aisle may be viewed by a plurality of persons 106 from all directions.

An advertisement 110 may be placed next to a product 108 that is being marketed in the advertisement 110. Alternatively, an advertisement 110 may be placed next to a product 108 that is unrelated to or complementary to the product 108 or service marketed in the advertisement 110. For example, a selection of tortilla chips in a supermarket aisle may have an advertisement 110 for salsa displayed next to it. As another example, a rack of suits in a department store may have an advertisement 110 for a tailoring service next to it. In one embodiment, an advertisement 110 may appear by itself, such as an advertisement on a store window pointed toward a street.

The one or cameras 102 are position to view the plurality of persons 106 and products 108 from a variety of angles. Different types of cameras 102 may be used within the system 100. A camera 102 may be a closed circuit camera, a wireless camera, and/or a webcam. A camera's 102 orientation may be fixed and thus only manually adjustable. Alternatively, a camera's 102 rotation may be remotely controlled by an operator or automated using motion sensing technology. An example of a remote controlled camera is a PTZ (pan-tilt-zoom) camera commonly used in casinos and hotels. In one embodiment, the one or more cameras 102 may be positioned in the midst of an area containing a plurality of products 108. For example, a PTZ camera may be placed in the ceiling of a store or showroom to observe one or more customers. In another embodiment, the one or more cameras 102 may be placed around the perimeter of an area holding a plurality of products 108, such as one or more corners of a store. In an alternative embodiment, a camera 102 may be position to face in substantially one direction, such as in a store window display pointing outward in the direction of passersby.

The one or more cameras 102 may be directly or indirectly connected to the customer analysis apparatus 104. For example, a camera 102 can be directly connected to the customer analysis apparatus 104 through one or more cables or through a wireless connection using specific radio frequencies. Alternatively, a camera 102 may be connected to the customer analysis apparatus 104 through a network, such as a local area network ("LAN"), a wide area network ("WAN"), the internet, or a wireless network (e.g., Wi-Fi, cellular, etc.). One of skill in the art will recognize alternative ways that a camera 102 can be connected to a customer analysis apparatus 104. Through the use of one or more cameras 102, the customer analysis apparatus 104 is able to determine a focus 112 of each person 106 in the vicinity of the plurality of products 108 or advertisements 110. By determining the focus 112 of each person 106 with respect to a product 108 or advertisement 110, the customer analysis apparatus 104 can evaluate the interest of a person 106 with respect to the product 108 or advertisement 110 as described with respect to the apparatuses 200 and 300 of FIGS. 2 and 3, respectively.

Figure 2:
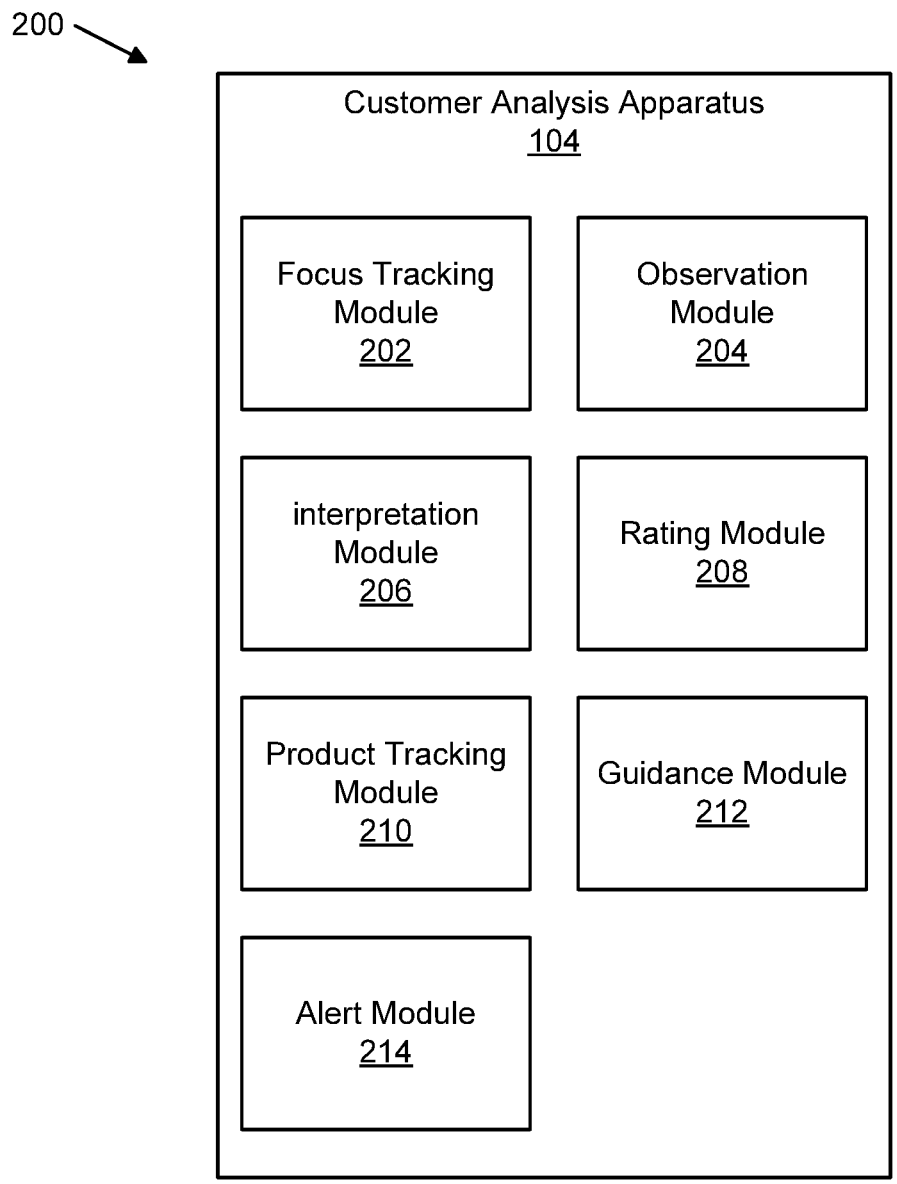
FIG. 2 is a schematic block diagram illustrating one embodiment of an apparatus for observing and analyzing customer opinion in accordance with the present invention.

FIG. 2 is a schematic block diagram illustrating one embodiment of an apparatus 200 for observing and analyzing customer opinion. The apparatus 200 includes one embodiment of a customer analysis apparatus 104 with a focus tracking module 202, an observation module 204, an interpretation module 206, a rating module 208, a product tracking module 210, a guidance module 212, and an alert module 214, which are described below.

The focus tracking module 202 uses the one or more cameras 102 to determine a product 108 having a focus 112 of a person 106. A product 108 is a good or service exchanged in a transaction, including but not limited to, sales, rentals, leases, exchanges, or giveaways. A product 108 can include a product 108 shown in an advertisement 110 or the advertisement 110 itself. Sometimes, a product 108 may include a collection of goods, such as a rack of dress shirts. At other times, a product 108 may be a single item, such as a particular dress shirt in a rack of dress shirts. A product 108 has a plurality of characteristics. Characteristics may include physical characteristics, such as the object's size (e.g., height, length, width, circumference), weight, color, texture, composition (e.g., wood, metal, fiber, glass, combination), shape, finish (e.g., matte, polished), and other measurable physical traits. Characteristics may also refer to non-physical attributes, such as origin (e.g., Made in Italy), manufacturer, brand name, product code, location, price, sales (e.g., total number of product 108 sold during a period of time, total number of product 108 returned during a period of time), and marketability.

The focus tracking module 202 analyzes video captured by the one or more cameras 102 to identify a product 108 having a focus 112 of the person 106. The focus tracking module 202 may use video taken by multiple cameras 102 from different angles to more precisely determine the product 108 having a focus 112 of a person 106. The focus tracking module 202 may determine a product 108 having a focus 112 of a person 106 in different ways. If a person's face is visible to the one or more cameras 102, the focus tracking module 202 can determine a product 108 having a focus 112 of the person 106 by tracking the tilt of the person's face and his or her gaze, including but not limited to the direction of the person's pupils. If a person's face is not visible to the one or more cameras 102, then the focus tracking module 202 may determine a product 108 having a focus 112 of the person 106 by extrapolating from one or more views of the person's head, including its tilt and rotation. For example, the focus tracking module 202 may find a product 108 having a focus 112 of a person 106 by extrapolating in a direction substantially opposite the back of the person's head.

The observation module 204 uses the one or more cameras 102 to monitor one or more physical, physiological, or behavioral characteristics of a person 106 with respect to a product 108. The observation module 204 can also use the one or more cameras 102 to monitor one or more physical, physiological, or behavioral characteristics of multiple persons 106. A person's physical characteristics include, but are not limited to, height, weight, gender, body type, eye color, skin tone, hair color, skin condition (e.g., smooth, wrinkled), tattoos, or presence/absence of hair (e.g., facial hair and/or baldness). A person's physiological characteristics include, but are not limited to, breathing pattern, the presence/absence of perspiration, body temperature, the presence/absence of skin color (e.g., if the person's face is flush), heart rate, and pupil dilation. A person's behavioral characteristics include, but are not limited to, body language, speech, facial expressions, eye movements, and gestures. Examples of a behavioral characteristic is whether a person is touching a product 108 or holding a product 108 up close.

In one embodiment, the observation module 204 monitors one or more physical, physiological, or behavioral characteristics of a person 106 with respect to a product 108 by visually recording the person 106 with the one or more cameras 102 over a period of time. The observation module 204 may monitor the person 106 for a preset amount of time (e.g., first five seconds after determining the person's product 108), a subset of time that a person 106 is focused on a product 108, the entire time a person 106 is focused on a product 108, or after the person's focus has moved away from the product 108. An example of the observation module 204 monitoring one or more physical, physiological, or behavioral characteristics of a person 106 is using one or more cameras 102 to record a person's facial expressions or subtle changes in the color of the person's face. Another example is the observation module 204 using one or more cameras 102 to record a movement of a person's pulse in his wrist, neck, or other body part.

In another embodiment, the observation module 204 monitors the one or more physical, physiological, or behavioral characteristics of a person 106 by using other apparatuses in conjunction with the camera 102. For example, the observation module 204 may use an infrared detector to determine a person's skin temperature and/or whether the person's skin is flush. The infrared detector may be thermal or photonic. Other types of apparatuses that may be used in conjunction with the one or more cameras 102 to monitor one or more physical, physiological, or behavioral characteristics of a person 106 include scanners that detect electromagnetic radiation (e.g., millimeter wave scanner with active or passive sensors) or microphones that pick up sounds from a person 106 (e.g., words, accents, speech patterns, laughter, sobbing).

The interpretation module 206 determines an opinion of a person 106 with respect to the product 108 being focused on by the person 106. An opinion may be positive, negative, or neutral. An opinion has an emotional component. Examples of emotions include, but are not limited to, fear, anger, sadness, joy, disgust, trust, anxiety, anticipation, surprise, and excitement. Sometimes, an opinion can include a combination of emotions. For example, a negative opinion may include both anger and disgust. An opinion also has an intensity, which can be measured and expressed in a variety of forms. For example, an opinion may be expressed on a numerical scale of 1 to 10, as different colors, and/or different sized shapes. The overall intensity of an opinion may be a function of the intensity of each emotion associated with the opinion. For example, a moderately positive opinion can be the result of great joy tempered with moderate sadness.

In an embodiment, the interpretation module 206 determines an opinion of a person 106 with respect to the product 108 by comparing the one or more physical, physiological, or behavioral characteristics recorded by the one or more cameras 102 to physical features, physiological symptoms, or behaviors mapped to specific emotions or opinions. For example, the interpretation module 206 may determine that a customer has a positive opinion of an advertisement 110 when it analyzes the customer's facial expression while the customer is looking at the advertisement 110 and notices that the customer is smiling. Alternatively, the interpretation module 206 may determine that a customer has a negative opinion of a product 108 when it analyzes the customer's facial expression while the customer is holding the product 108 and notices that the customer has a look of disgust and/or sadness. As another example, the interpretation module 206 may determine that a customer has a highly positive opinion of a product 108 when it analyzes the customer's speech patterns and notes that the customer is speaking excitedly. In yet another example, the interpretation module 206 may determine a customer's opinion of a product 108 by analyzing the customer's posture (e.g., leaning in or away from the product 108), arm position (e.g., crossed in front of chest, holding the product 108 up close), the length of time that the customer has been focused on the product 108 (e.g., longer focus denotes more interest and higher positive opinion), or physiology (e.g., quickened pulse, flush face, rapid breathing, pupil dilation may indicate excitement, surprise, or joy).

In one embodiment, the interpretation module 206 determines an opinion of a person 106 with respect to a product 108 over a period of time. This period of time may be predetermined (e.g., two second interval) or denoted by the amount of time that a person remains focused on the product 108. It may be advantageous to determine an opinion of a person 106 with respect to a product 108 over time because the person's opinion may change during that time. For example, a customer who sees a pair of shoes may initially have a positive reaction or opinion of the shoes and quickly walk over to pick up the shoes. But the customer's opinion of the shoes may change to become negative once the customer sees the price of the shoes. The opinion of a person 106 with respect to a product 108 over a period of time may be the person's initial opinion at the start of the period of time or the person's final opinion at the end of the period of time. Alternatively, the opinion of a person 106 with respect to the person's product 108 over a period of time may be a combination (e.g., average) of the person's opinions during that period of time.

In some embodiments, the interpretation module 206 also determines that a person 106 needs assistance to find a product 108. In this instance, the interpretation module 206 determines that a person 106 needs assistance to find a product 108 by matching the one or more behavioral characteristics recorded by the one or more cameras 102 to behaviors indicating that a person 106 needs assistance. For example, the interpretation module 206 may determine that a customer needs assistance when it recognizes that he is scanning a rack of clothes or the store by moving his eyes and/or head. In certain embodiments, the interpretation module 206 also determines that a person 106 needs assistance with respect to a product 108. In this instance, the interpretation module 206 determines that a person 106 needs assistance with respect to a product 108 by matching the one or more behavioral characteristics recorded by the one or more cameras 102 to behaviors indicating that a person 106 needs assistance with respect to a product 108. For example, the interpretation module 206 may determine that a customer needs help to find a particular size of clothing when it recognizes that the customer is digging through a pile of clothes.

In some instances, the interpretation module 206 also determines that a person 106 poses a potential threat. In this case, the interpretation module 206 determines that a person 106 poses a potential threat by matching the one or more behavioral characteristics recorded by the one or more cameras 102 to behaviors indicating that a person 106 may harm another person 106 or damage property. For example, the interpretation module 206 may determine that a customer is a potential threat when it recognizes that the customer has hidden a product 108 in her purse and determines that the customer's heart rate rose dramatically. In such a situation, the one or more cameras 102 may automatically zoom in on the customer and continue to follow him or her throughout the store.

In a certain embodiment, the interpretation module 206 may determine a medical condition of a person 106. A medical condition of a person 106 can include a variety of conditions, such as a heart attack, stroke, or respiratory problems (e.g., asthma attack). The interpretation module 206 may determine a medical condition of a person 106 by analyzing the one or more physical, physiological, or behavioral characteristics recorded by the one or more cameras 102. For example, the interpretation module 206 may determine that a person 106 has a respiratory problem by comparing the person's breathing pattern and/or sounds to known patterns or sounds indicating respiratory problems. As another example, the interpretation module 206 may determine that a person 106 is having a heart attack by detecting the presence of a cold sweat and shortness of breath in the video recorded by the one or more cameras 102 and matching it to known patterns.

The rating module 208 adjusts one or more ratings of the product 108 in response to the interpretation module 206 determining the opinion of the person 106 regarding the product 108. Each characteristic for a product 108 may have a rating, and the product 108 may have a composite rating that is a function of individual ratings for each characteristic of the product 108. The composite rating may be a simple average of all the individual ratings, a weighted average, or a similar average of a subset of the individual ratings. A rating may be expressed or measured in a variety of forms. For examples, it can be expressed on a numerical scale of 1 to 100 or one to five stars. Initially, a product 108 may have an average rating (e.g., 50 out of 100) that is then adjusted upward or downward based on the opinion of a person 106. A positive opinion from a person 106 will cause the rating of a product 108 to rise, while a negative opinion from a person 106 will cause the rating to fall. The intensity of an opinion from a person 106 determines how much the rating of a product 108 may rise or fall.

In one embodiment, the rating module 208 adjusts the composite rating of the product 108 in response to the interpretation module 206 determining the opinion of the person 106 regarding the product 108. In another embodiment, the rating module 208 adjusts a rating of one or more characteristics of the product 108 in response to the interpretation module 206 determining the opinion of the person 106 regarding the product 108. For example, the interpretation module 206 may determine that a customer's initial opinion to seeing a product 108 in a retail store is positive, which may cause the rating module 208 to adjust the ratings for the physical characteristics of the product 108 upwards. But if the interpretation module 206 determines a few seconds later that the customer's opinion changes over time, the rating module 208 may then adjust the ratings for the physical characteristics of the product 108 downwards.

The product tracking module 210 stores the one or more ratings of the product 108. The product tracking module 210 may store the one or more ratings of the product 108 using a relational database management system. In an embodiment, the product tracking module 210 stores only the most recent composite rating and rating for each characteristic of the product 108. In another embodiment, the product tracking module 210 stores a history of ratings for a product 108. For example, the product tracking module 210 can store the daily composite rating of a product 108 for the past week, or the hourly composite rating of the price of a product 108 for the past day. Where the product tracking module 210 stores a history of ratings for a product 108, it can also store a running average of each rating (e.g., average composite rating for a product 108 during the past week, average price rating for a product 108 during the past month). The product tracking module 210, in one embodiment, also stores a number of persons 106 who have placed their focus 112 on a specific product 108. In a further embodiment, the product tracking module 210 also stores a total amount of time that a product 108 has been a focus 112 of one or more persons 106 during a period of time.

The guidance module 212 recommends one or more actions regarding the product 108 based on the one or more ratings of the product 108. For example, the guidance module 212 can recommend that a store stock more of a product 108 when the composite rating of the product 108 meets or exceeds a specific threshold. Conversely, the guidance module 212 can recommend that a store stop selling a product 108 or switch advertisements 110 for the product 108 in response to a steep drop in the product 108 or the advertisement's composite rating or price rating. Alternatively, the guidance module 212 may recommend that a store lower the price of a product 108 when the moving average of the product's composite rating or price rating is trending lower. In another example, the guidance module 212 may recommend that a store change the location of a product 108 within the store based upon its composite rating. The guidance module 212 may also recommend extending a sale or promotion in an advertisement 110 based upon the composite rating of the advertisement 110. In some cases, the guidance module 212 may recommend that a product 108 be moved to another location because it has a low location rating. Alternatively, the guidance module 212 may recommend changing the configuration of the store based on the location ratings of certain products 108.

In some cases, the guidance module 212 recommends one or more actions regarding the product 108 based on a number of persons who have focused on the product 108 during a period of time. In other cases, the guidance module 212 recommends one or more actions regarding the product 108 based on an amount of time that the number of persons have focused on the product. For example, the guidance module 212 may recommend that a pair of shoes in a store be moved to a different location in the store if very few people have focused on the shoes in a week. As another example, the guidance module 212 may recommend that a store order more of a certain product 108 because customers spend a lot of time looking at them.

The alert module 214 sends a notification to one or more other persons 106 in response to the interpretation module 206 determining a medical condition of the person 106. The one or more other persons 106 may be medical personnel (e.g., doctors, nurses, and/or EMTs), store employees, and/or security guards. The notification may take the form of a text message, electronic mail, an audible warning (e.g., siren), and/or a visual warning (e.g., flashing light, strobe light). The notification may include the person's description or location. For example, the alert module 214 may send a text message to store employees notifying them a customer on the $3^{rd}$ floor of the department store may need medical attention while sending a similar notification to an emergency call center (e.g., 911).

In one embodiment, the alert module 214 also sends a notification to one or more other persons 106 in response to the interpretation module 206 determining that the person 106 needs assistance to find a product 108. For example, the alert module 214 may send a text message to a supermarket employee that a customer may need assistance finding a product 108 in a particular supermarket aisle. In another embodiment, the alert module 214 also sends a notification to one or more other persons 106 in response to the interpretation module 206 determining that the person 106 needs assistance with respect to a product 108. For example, the alert module 214 may notify store employees to check the store inventory when it detects a customer looking through a rack of clothes for a particular style of clothing.

In some embodiments, the alert module 206 sends a notification to one or more other persons 106 in response to the interpretation module 206 determining that a person 106 is a potential threat. The alert module 206 may notify store employees and/or a security service with the person's description and/or location. For example, the alert module 214 may send a text message to security guards notifying them that a customer in a certain aisle is acting suspiciously.

Figure 3:
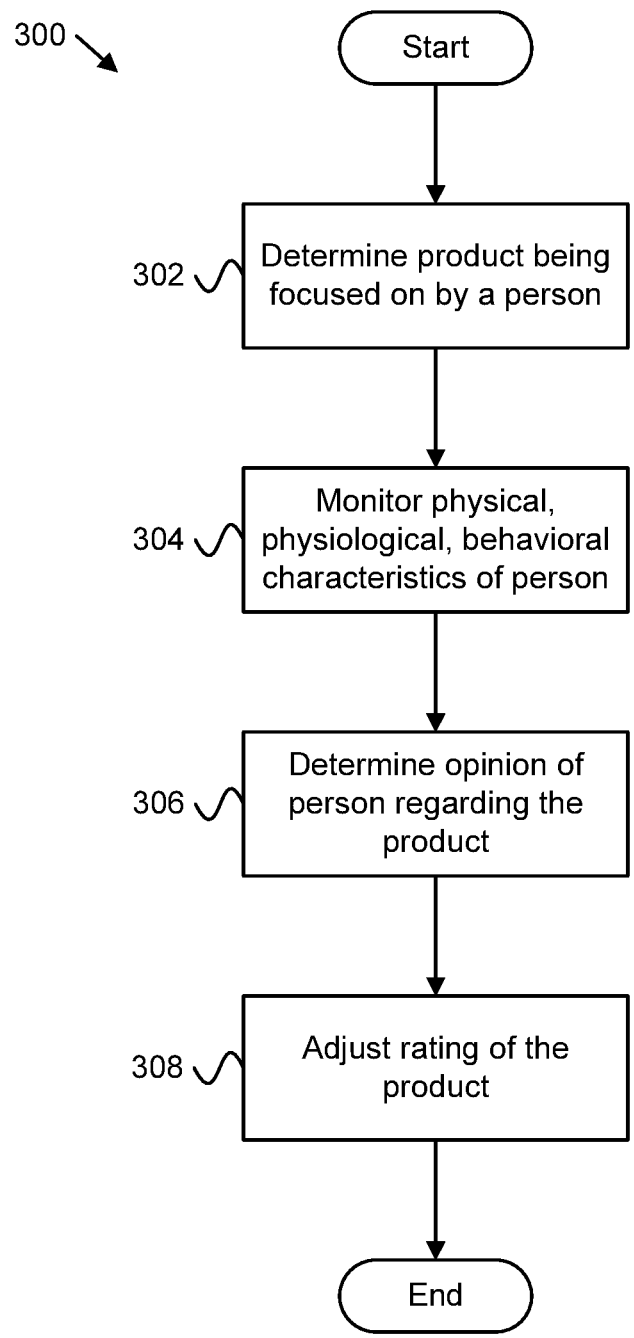
FIG. 3 is a schematic flow chart diagram illustrating one embodiment of a method for observing and analyzing customer opinion in accordance with the present invention.

FIG. 3 is a schematic flow chart diagram illustrating one embodiment of a method 300 for observing and analyzing customer opinion. The method 300 begins and using one or more cameras 102 determines 302 a product 108 having a focus 112 of a person 106, the product 108 having a plurality of characteristics. The method 300 uses the one or more cameras 102 to monitor 304 one or more physical, physiological, or behavioral characteristics of the person 106 with respect to the product 108. The method 300 determines 306 an opinion of the person 106 regarding the product 108. The method 300 adjusts 308 one or more ratings of the product 108 in response to determining the opinion of the person 106 regarding the product 108, and the method 300 ends.

Figure 4:
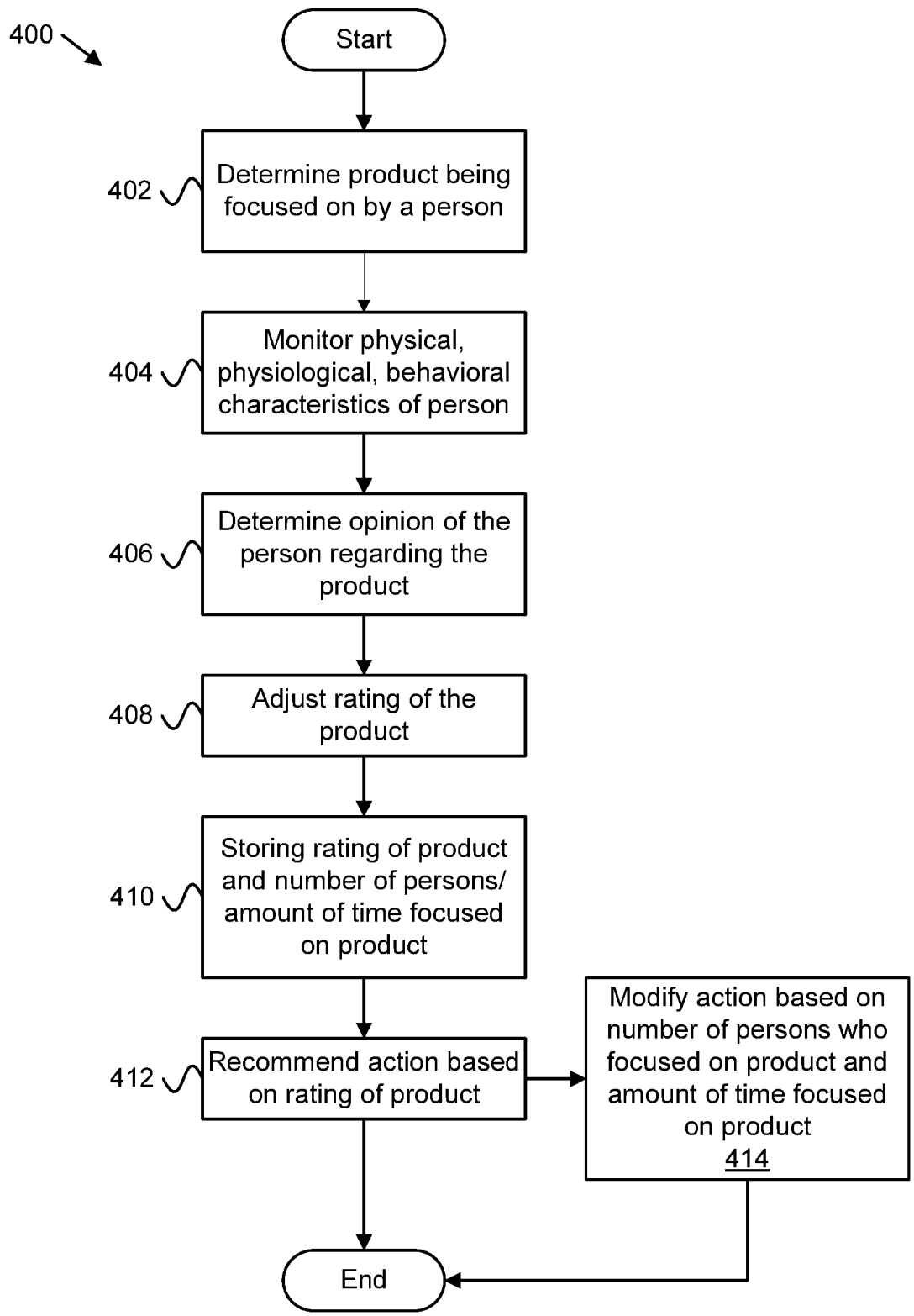
FIG. 4 is a schematic flow chart diagram illustrating another embodiment of a method for observing and analyzing customer opinion in accordance with the present invention.

FIG. 4 is a schematic flow chart diagram illustrating another embodiment of a method for observing and analyzing customer opinion in accordance with the present invention. The method 400 begins and using one or more cameras 102 determines 402 a product 108 having a focus 112 of a person 106, the product 108 having a plurality of characteristics. The method 400 uses the one or more cameras 102 to monitor 404 one or more physical, physiological, or behavioral characteristics of the person 106 with respect to the product 108. The method 400 determines 406 an opinion of the person 106 regarding the product 108. The method 400 adjusts 408 one or more ratings of the product 108 in response to determining the opinion of the person 106 regarding the product 108. The method 400 stores 410 the one or more ratings of the product 108, the number of persons 106 who have focused on the product 108, and the amount of time that the number of persons 106 have focused on the product 108. The method 400 recommends 412 one or more actions regarding the product 108 based on the one or more ratings of the product 108, and the method 400 ends. In one embodiment, the method 400 also recommends 412 one or more actions based on a number of persons 106 who have focused on the product 108 and/or an amount of time that the number of persons 106 have focused on the product 108, and the method 400 ends. In another embodiment, the method 400 modifies 414 the recommended action based on a number of persons 106 who have focused on the product and an amount of time the number of persons 106 have focused on the product, and the method 400 ends. For example, one may recommend different actions for two products 108 with similar ratings if the first product 108 has been viewed by a lot more customers than the second product 108. In this example, the rating for the first product 108 is more likely to be accurate than the rating for the second product 108 because of the larger sample size of customers who have viewed the first product 108.

Figure 5:
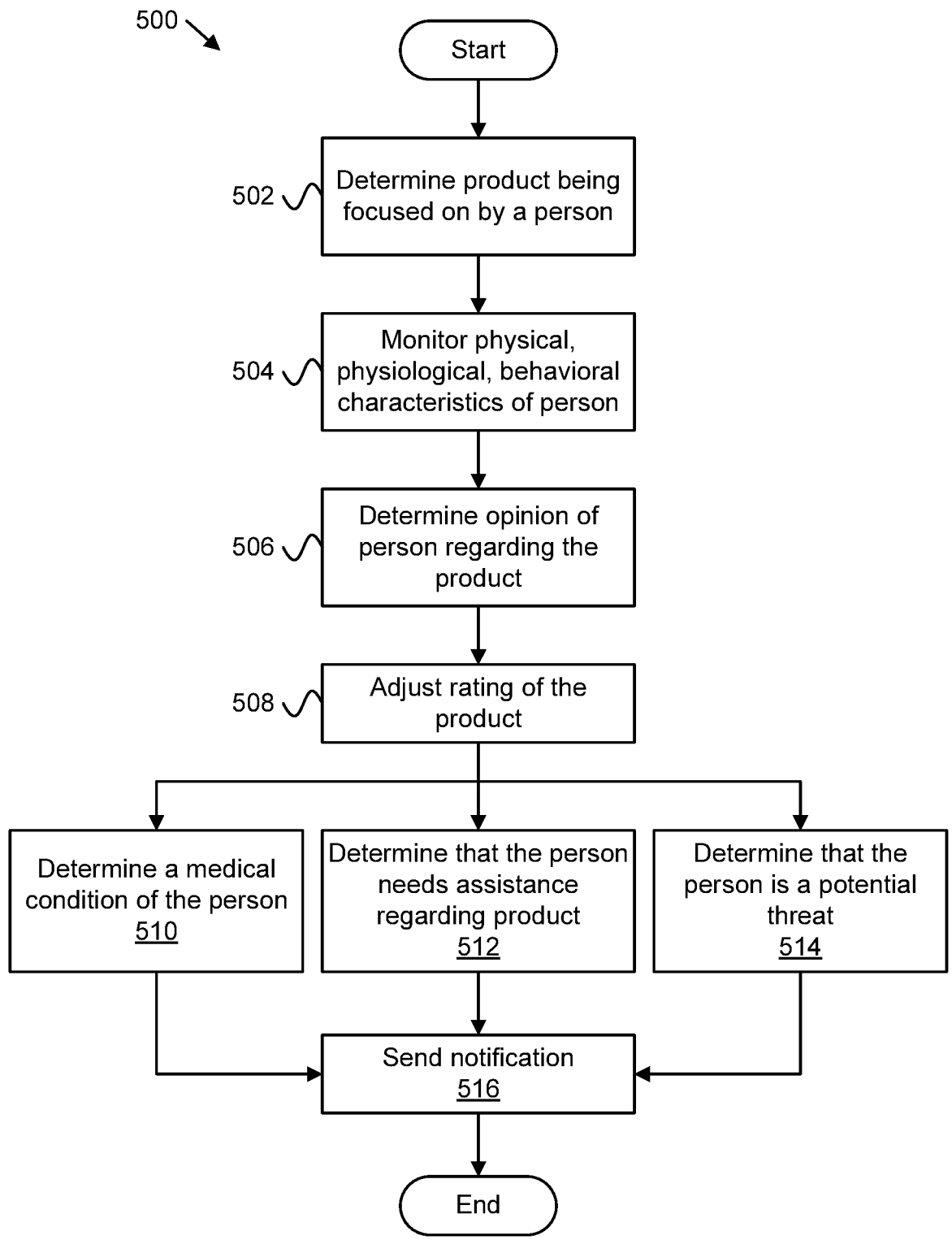
FIG. 5 is a schematic flow chart diagram illustrating yet another embodiment of a method for observing and analyzing customer opinion in accordance with the present invention.

FIG. 5 is a schematic flow chart diagram illustrating yet another embodiment of a method for observing and analyzing customer opinion in accordance with the present invention. The method 500 begins and using one or more cameras 102 determines 502 a product 108 having a focus 112 of a person 106, the product 108 having a plurality of characteristics. The method 500 uses the one or more cameras 102 to monitor 504 one or more physical, physiological, or behavioral characteristics of the person 106 with respect to the product 108. The method 500 determines 506 an opinion of the person 106 regarding the product 108. The method 500 adjusts 508 one or more ratings of the product 108 in response to determining the opinion of the person 106 regarding the product 108. In one embodiment, the method 500 determines 510 a medical condition of the person 106, and in response, sends 516 a notification to one or more other persons 106, and the method 500 ends. In another embodiment, the method 500 determines 512 that the person 106 needs assistance regarding the product 108, and in response, sends 516 a notification to one or more other persons, and the method 500 ends. In certain embodiments, the method 500 determines 514 that the person 106 is a potential threat, and in response, sends 516 a notification to one or more other persons, and the method 500 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
    a set of cameras; and
    an analysis apparatus coupled to the set of cameras, the analysis apparatus comprising:
        a focus tracking module that uses the set of cameras to identify an actual consumer product displayed in a real-world retail environment including a focus of a customer, said focus on the consumer product identified by:
            tracking face tilt and eye gaze of the customer in relation to the consumer product when the customer's face is visible to the set of cameras, and
            tracking head tilt and rotation of the customer in relation to the consumer product when the customer's face is not visible to the set of cameras;
        an observation module that uses the set of cameras to detect one or more of a set of physical responses, a set of physiological responses, and a set of behavioral responses of the person with respect to the consumer product; and
        an interpretation module that determines an opinion of the customer regarding the consumer product based on the detected one or more of the set of physical responses, the set of physiological responses, and the set of behavioral responses of the person with respect to the consumer product,
    wherein at least a portion of the observation module, the focus tracking module, and the interpretation module, comprise one or more of computer hardware and executable code, the executable code stored on one or more non-transitory computer-readable storage media.

2. The system of claim 1, further comprising:
    a product tracking module that stores one of a quantity of customers that have focused on the consumer product and an amount of time that each of the quantity of customers have focused on the consumer product.

3. The system of claim 2, wherein the product tracking module stores the quantity of customers that focused on the consumer product, the system further comprising:
    a guidance module that recommends a set of actions regarding the consumer product based on the quantity of customers that focused on the consumer product.

4. The system of claim 2, wherein the product tracking module stores the amount of time that each of the quantity of customers focused on the consumer product, the system further comprising:
    a guidance module that recommends a set of actions regarding the consumer product based on the amount of time that each of the quantity of customers focused on the consumer product.

5. The system of claim 1, wherein the interpretation module is further configured to determine a medical condition of the customer, the analysis apparatus further comprising:
    an alert module that transmits a notification to a third party in response to the interpretation module determining the medical condition of the customer.

6. The system of claim 1, wherein the interpretation module is further configured to determine that the customer needs assistance with respect to the consumer product, the analysis apparatus further comprising:
    an alert module that transmits a notification to a third party in response to the interpretation module determining that the customer needs assistance.

7. The system of claim 1, wherein the set of detected physiological responses comprises one or more of a pulse, a heart rate, a breathing rate, a breathing pattern, a skin temperature, a body temperature, and a pupil dilation.

8. The system of claim 1, wherein:
    the consumer product comprises a plurality of characteristics; and
    a set of ratings for the consumer product comprises a respective rating for each characteristic of the plurality of characteristics.

9. The system of claim 8, wherein:
    the set of ratings further comprises a composite rating based on the respective rating for each characteristic of the plurality of characteristics.

10. A method comprising:
    identifying, via a set of cameras, an actual consumer product being displayed in a real-world retail environment including a focus of a person, wherein the focus on the consumer product is identified by:
        tracking face tilt and eye gaze of the customer in relation to the consumer product when the customer's face is visible to the set of cameras, and
        tracking head tilt and rotation of the customer in relation to the consumer product when the customer's face is not visible to the set of cameras;
    detecting, via the set of cameras, one or more of a set of physical responses, a set of physiological responses, and a set of behavioral responses of the person with respect to the consumer product; and
    determining, by a processor, an opinion of the customer regarding the consumer product based on the detected one or more of the set of physical responses, the set of physiological responses, and the set of behavioral responses of the person with respect to the consumer product.

11. The method of claim 10, further comprising storing one of:
    a quantity of customers that have focused on the consumer product; and
    an amount of time that each of the quantity of customers have focused on the consumer product.

12. The method of claim 11, wherein the quantity of customers that have focused on the consumer product is stored, the method further comprising:
    recommending a set of actions regarding the consumer product based the quantity of customers that have focused on the consumer product.

13. The method of claim 11, wherein the amount of time that each of the quantity of customers focused on the consumer product is stored, the method further comprising:
    recommending a set of actions regarding the consumer product based on the amount of time that the quantity of customers focused on the consumer product.

14. The method of claim 10, further comprising:
    determining a medical condition of the customer; and
    in response to determining the medical condition of the customer, transmitting a notification to a third party.

15. The method of claim 10, further comprising:
    determining that the customer needs assistance with respect to the consumer product; and in response to determining that the customer needs assistance, transmitting a notification to a third party.

16. A computer program product for observing and analyzing customer opinion, the computer program product comprising a non-transitory computer-readable storage medium including program instructions embodied therewith, the program instructions readable/executable by a processor to cause the processor to:
- identify, via a set of cameras, an actual consumer product being displayed in a real-world retail environment having a focus of a customer, said focus on the consumer product identified by:
  - tracking face tilt and eye gaze of the customer in relation to the consumer product when the customer's face is visible to the set of cameras, and
  - tracking head tilt and rotation of the customer in relation to the consumer product when the customer's face is not visible to the set of cameras;
- detect, via the set of cameras, one or more of a set of physical responses, a set of physiological responses, and a set of behavioral responses of the person with respect to the consumer product; and
- determine an opinion of the customer regarding the consumer product based on the detected one or more of the set of physical responses, the set of physiological responses, and the set of behavioral responses of the person with respect to the consumer product.

17. The computer program product of claim 16, the program instructions further causing the processor to store one of:
- a quantity of persons that have focused on the consumer product; and
- an amount of time that each the quantity of customers focused on the consumer product.

18. The computer program product of claim 17, the program instructions further causing the processor to:
- recommend a set of actions regarding the consumer product based on one of the stored quantity of persons that have focused on the consumer product and the stored amount of time that each the quantity of customers focused on the consumer product.

19. The computer program product of claim 16, the program instructions further causing the processor to:
- determine a medical condition of the customer; and
- transmit a notification to a third party in response to determining the medical condition of the customer.

20. The computer program product of claim 16, the program instructions further causing the processor to:
- determine that the customer needs assistance with respect to the consumer product; and
- transmit a notification to a third party in response to determining that the customer needs assistance.

* * * * *